United States Patent [19]
Ohmura et al.

[11] Patent Number: 4,896,178
[45] Date of Patent: Jan. 23, 1990

[54] LENS-FITTED PHOTOGRAPHIC FILM UNIT

[75] Inventors: Hiroshi Ohmura; Takaaki Kotani; Tokuji Sato; Tsutomu Tanaka, all of Tokyo, Japan

[73] Assignee: Fuji Photo Film Co., Ltd., Kanagawa, Japan

[21] Appl. No.: 253,545

[22] Filed: Oct. 5, 1988

[30] Foreign Application Priority Data

Oct. 5, 1987 [JP] Japan ............................ 62-152637
Oct. 5, 1987 [JP] Japan ............................ 62-251263

[51] Int. Cl.$^4$ ..................... G03B 15/05; G03B 17/02
[52] U.S. Cl. ..................... 354/145.1; 354/149.11; 354/288
[58] Field of Search ............... 354/126, 145.1, 149.11, 354/288

[56] References Cited
U.S. PATENT DOCUMENTS

| | | | |
|---|---|---|---|
| 4,148,573 | 4/1979 | Yamanaka | 354/149.11 |
| 4,351,598 | 9/1982 | Suzuki et al. | 354/288 |
| 4,351,599 | 9/1982 | Suzuki et al. | 354/288 |

FOREIGN PATENT DOCUMENTS

| | | | |
|---|---|---|---|
| 59-174823A | 10/1984 | Japan | 354/288 |
| 1032494 | 6/1966 | United Kingdom . | |
| 1034045 | 6/1966 | United Kingdom . | |
| 1420848 | 1/1976 | United Kingdom . | |
| 2010501 | 6/1979 | United Kingdom . | |

*Primary Examiner*—A. A. Mathews
*Attorney, Agent, or Firm*—Young & Thompson

[57] ABSTRACT

A lens-fitted film unit with an electronic flash is provided with a film container cover member covering a film container receiving chamber of a film unit housing which is opened to remove a film container from the film container receiving chamber and a battery cover member covering a battery receiving chamber of the film unit housing. The battery cover member is operationally integrated with the film container cover member so as always to be opened when the film container cover member is opened to remove the film container containing an exposed film from the film unit housing.

16 Claims, 9 Drawing Sheets

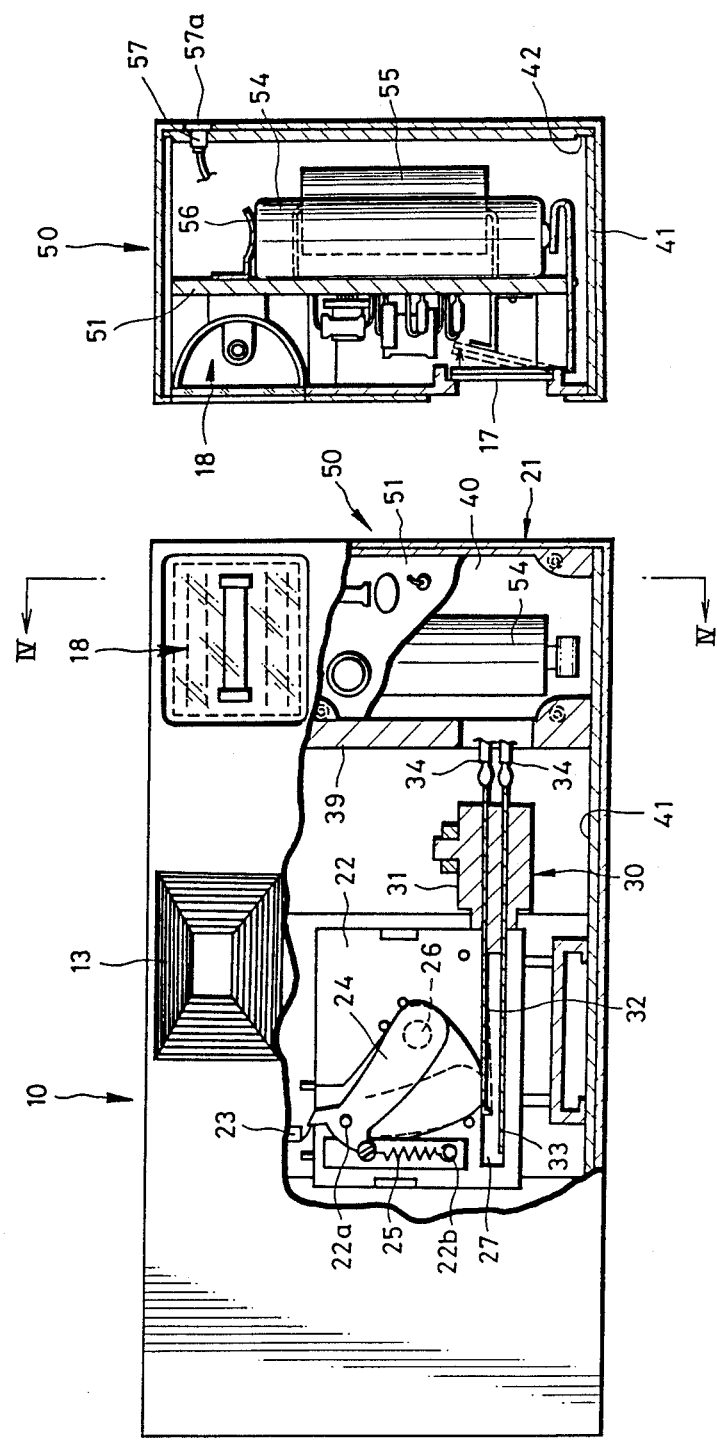

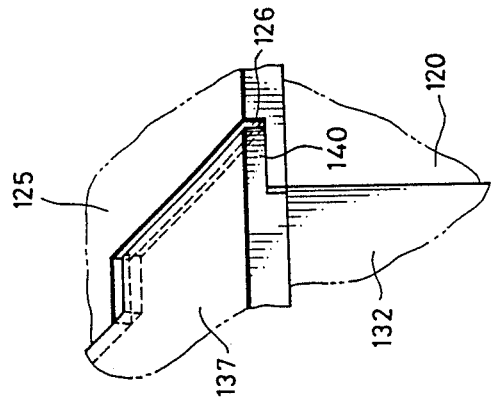
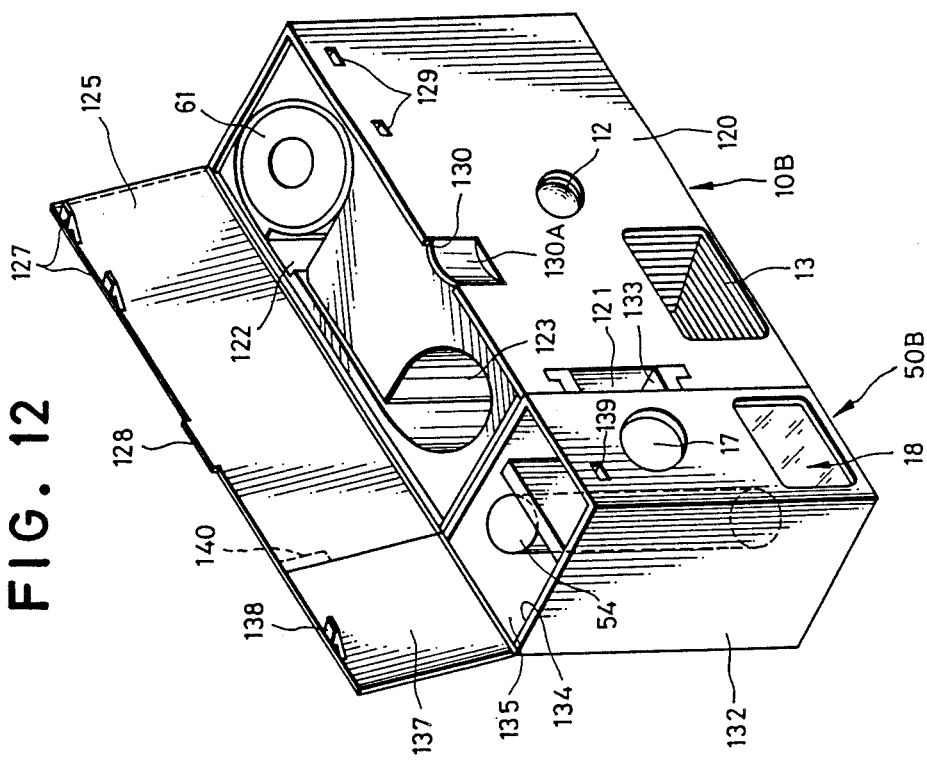
FIG. 12
FIG. 13

LENS-FITTED PHOTOGRAPHIC FILM UNIT

BACKGROUND OF THE INVENTION

The present invention relates to a lens-fitted photographic film unit, and more particularly to a disposable lens-fitted film unit with an electronic flash.

Recently, there have come on the market disposable or single-use lens-fitted photographic film units which have a roll of film and a simple exposure mechanism incorporated in a casing. Because such a lens-fitted photographic film unit can be sold wherever photographic film is sold, if one who takes no camera along but wants to take pictures, it is easy to get a new lens-fitted photographic film unit and to take pictures without a camera.

To provide such lens-fitted photographic film units at low cost, a simple shutter is used to give a single shutter speed such as 1/100 sec. On the other hand, the film used in such a lens-fitted photographic film unit has a relatively wide range of latitude of exposure. Although such a single shutter speed is employed and the photographic film used in the lens-fitted photographic film unit has a relatively wide exposure range, nevertheless it is relatively hard to cover high or low brightness objects.

Recent photofinishing techniques make it possible to a certain extent to make prints with proper density from negatives of images of subjects whose brightness is relatively high or relatively low. However, it remains frequently difficult to make prints from negatives of images of objects of too low brightness. In consideration of this, it has been proposed to use a disposable electronic flash either built in or removably attached to the lens-fitted photographic film unit, to cover the low end of the brightness range.

After all of the frames of film in the film unit, either with a built-in electronic flash or with a disposable electronic flash attached thereto, have been exposed, the film unit, with its associated electronic flash, is forwarded to a photo shop or photo laboratory to develop the exposed film and to make prints from the developed film. At that place, after removing the exposed film, the used film unit with its electronic flash is scrapped.

Since batteries contain poisonous substances such as mercury or mercury compounds which cause harm to the public, the batteries have to be removed from the used film units before scrapping them. Usually, a battery is incorporated either in a film unit housing or in an electronic flash housing. For removing the battery from the film unit housing or the electronic flash unit housing, it is necessary to destroy the housing. This is a somewhat troublesome task in photo shops or photo laboratories.

OBJECT OF THE INVENTION

It is, therefore, an object of the present invention to provide a lens-fitted unit with a built-in electronic flash or a disposable electronic flash unit attached thereto, from which a battery is removed with ease when the exposed film is removed therefrom.

SUMMARY OF THE INVENTION

The above and other objects of the present invention are accomplished by providing a lens-fitted film unit with an electronic flash which is provided with a battery cover member openable with ease.

A particular feature of the lens-fitted photographic film unit with an electronic flash of the present invention resides in the provision of a film container cover member covering a film container receiving chamber of a film unit housing which is opened to remove a film container from the film container receiving chamber, and a battery cover member covering a battery receiving chamber of the film unit housing, the battery cover member being opened in cooperation with the film container cover member.

According to a preferred embodiment of the present invention, the lens-fitted film unit has the film container receiving chamber and the battery chamber disposed side by side. These chambers may be formed in a single film unit housing. In this case, the film container cover member and the battery cover member are integrally formed as one member. Alternatively, these chambers may be separately formed in a film unit housing and in an electronic flash housing which are connectable to each other as one unit. In this case, one of the film container and battery cover members is formed with an engaging member which is engaged by the battery cover member upon connecting the two housings. Owing to this engagement, the battery cover member is opened in cooperation with the opening of the film container cover member.

Because the battery cover member is always opened when the film container cover member is opened to remove a film container containing an exposed film for developing the exposed film, an additional operation such as destroying a part of the film unit is not necessary to take out the battery. This leads not only to an easy operation of removing the battery from the film unit but also to the prevention of scrapping the film unit without removing the battery.

According to another advantageous feature of the present invention, the battery cover member has means to press the top and bottom poles of a battery to firmly hold the battery. Owing to this provision, the battery is prevented from being subjected to shocks and vibrations, so that the electronic flash is prevented from misfiring.

BRIEF DESCRIPTION OF THE DRAWINGS

These and other objects and features of the present invention will become apparent from the following description of preferred embodiments thereof with reference to the accompanying drawings in which like parts and elements are designated by the same reference numerals throughout the several views of the drawings and wherein:

FIG. 3 is a front view partially showing the interior of the lens-fitted film unit of FIG. 1;

FIG. 4 is a cross sectional view taken along a line IV—IV of FIG. 3 showing the interior of the lens-fitted photographic film unit of FIG. 1;

FIG. 12 is a perspective view illustrating a lens-fitted photographic film unit with a disposable electronic flash according to a still further preferred embodiment of the present invention; and FIG. 13 is a fragmentary perspective view showing details of cover members of a film unit and a disposable electronic flash attached to each other.

DETAILED DESCRIPTION OF THE INVENTION

Figure 1:
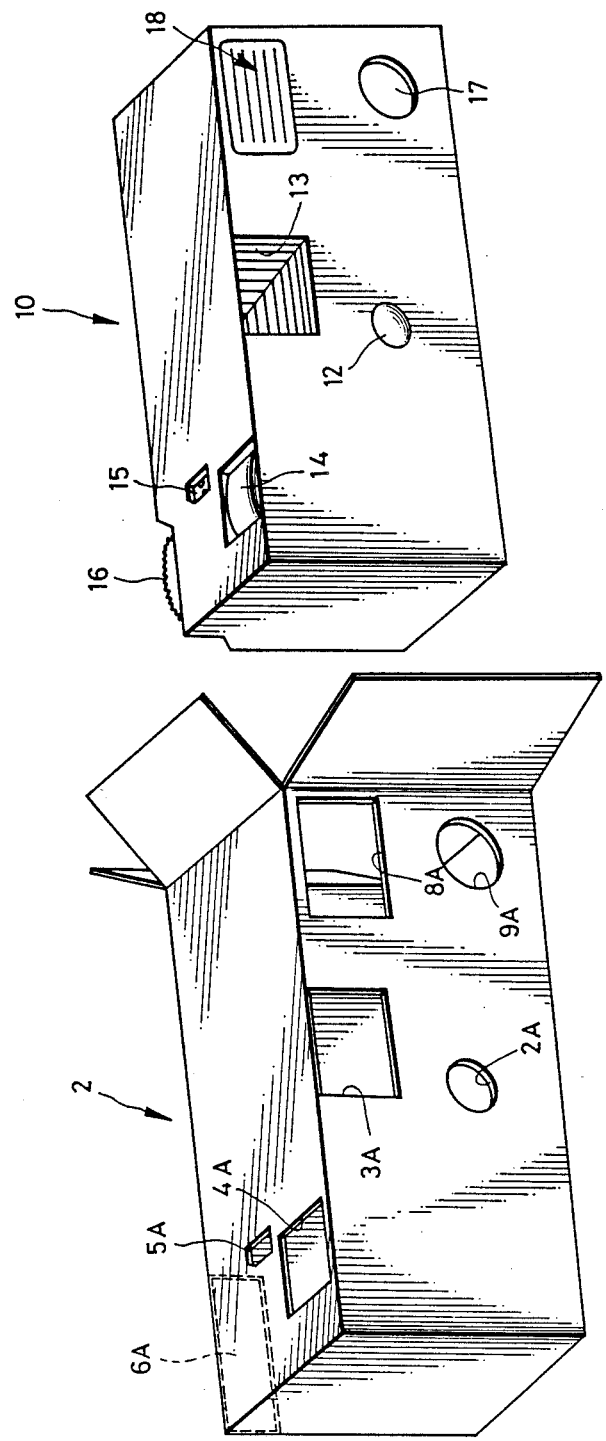
FIG. 1 is an exploded perspective view of a lens-fitted photographic film unit with a built-in electronic flash of a preferred embodiment of the present invention which is preferably encased in an external casing illustrated to the left of the lens-fitted photographic film unit.

Referring now to FIG. 1, shown therein is a lens-fitted photographic film unit 10 (which is thereinafter referred to as a film unit for simplicity) of the present invention which has a built-in electronic flash unit 50 which is sufficiently cheap to be disposable and will be described in detail later. The film unit 10 is provided with a taking lens 12, a finder window 13, a shutter release button 14, a frame counter 15, a film advancing knob 16, a power supply switch 17 for the electronic flash unit 50 and a light emitting window 18 of the electronic flash unit 50 which are all simple in construction and operation and are well known in the art.

Figure 2:
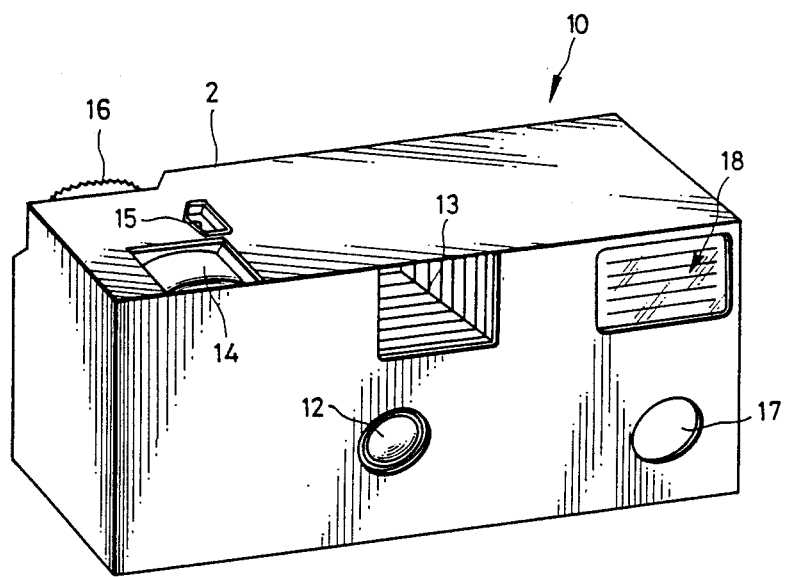
FIG. 2 is a perspective view showing the lens-fitted photographic film unit encased in the external casing of FIG. 1.

Shown to the left of the film unit 10 is an external casing 2 in which the film unit 10 is encased tightly. The external casing 2 is made of a printable cardboard or a printable thin plastic sheet or the like. The external casing 2, to which printing and/or an ornamental surface pattern can be applied, is formed with rectangular or circular openings 2A through 9A punched out for exposing the above-mentioned elements of the film unit 10, respectively. After applying an ornamental surface pattern and the necessary printing to a blank, the blank is folded to form the external casing 2. The film unit 10 is encased in the external casing 2 tightly as one body as shown in FIG. 2.

Referring to FIG. 3 showing the lens-fitted photographic film unit 10 with the electronic flash 50 built therein, a film unit housing 21 of the film unit 10 is provided with a shutter bearing base plate 22 formed integrally therewith and disposed at the middle thereof. Above the shutter bearing base plate 22, there is a shutter actuating lever 23 disposed in the film unit housing 21. A pivot pin 22a mounted on the shutter bearing base plate 22 pivotably mounts thereon a shutter blade 24 which is in engagement with the shutter actuating lever 23 and is urged to turn in the counterclockwise direction by means of a spring 25 stretched between the shutter blade 24 and a pin 22b mounted on the shutter bearing base plate 22.

At the center of the shutter bearing base plate 22, there is an exposure aperture 26 defined by a circular opening formed in the shutter bearing base plate 22 which is normally closed by the shutter blade 24. Below the exposure aperture 26, there is a transverse slot 27 formed in the shutter bearing base plate 22 wherein contact members 32 and 33 of a synchronizing contact unit 30 ar received. This synchronizing contact unit 30 comprises a pair of the contact members 32 and 33 in the form of an electrically conductive leaf spring and a molded holding block 31 of a plastic material for electrically shielding the contact members 32 and 33.

The contact members 32 will be bent down toward the contact member 33 at its inner end so as to be brought into contact with the contact member 33 when the shutter blade 24 moves down to fully open the exposure aperture 26. The base ends of the contact members 32 and 33 are connected to a trigger circuit of the electronic flash unit 50 by way of lead wires 34. At the bottom of the film unit housing 21, there is a manually openable bottom cover 53.

The electronic flash 50 is built into a flash unit chamber 40 of the film unit housing 21, chamber 4 being divided by a partition wall 39 from the rest of the film unit as is shown in FIG. 4. In the chamber 40, there is a printed circuit base board 51 which holds the flash lamp assembly 18 and the charge switch 17 on the front thereof and a main capacitor 55 and a battery 54, for example a UM-3 or UM-4 battery, as a power source for the electronic flash 50 on the back thereof. This battery 54 is held by spring contact members 56 connected to an electronic flash charging and discharging circuit. As is seen in FIG. 4, in an upper section of the back wall of the housing 21, there is formed a small opening 57a with a neon lamp 57 disposed therein which, when the main capacitor 55 is charged, emits red light to indicate that the electronic flash 50 is ready for discharging radiation. This lamp 57 is connected to the printed circuit base plate 51 through a wire.

Figure 5:
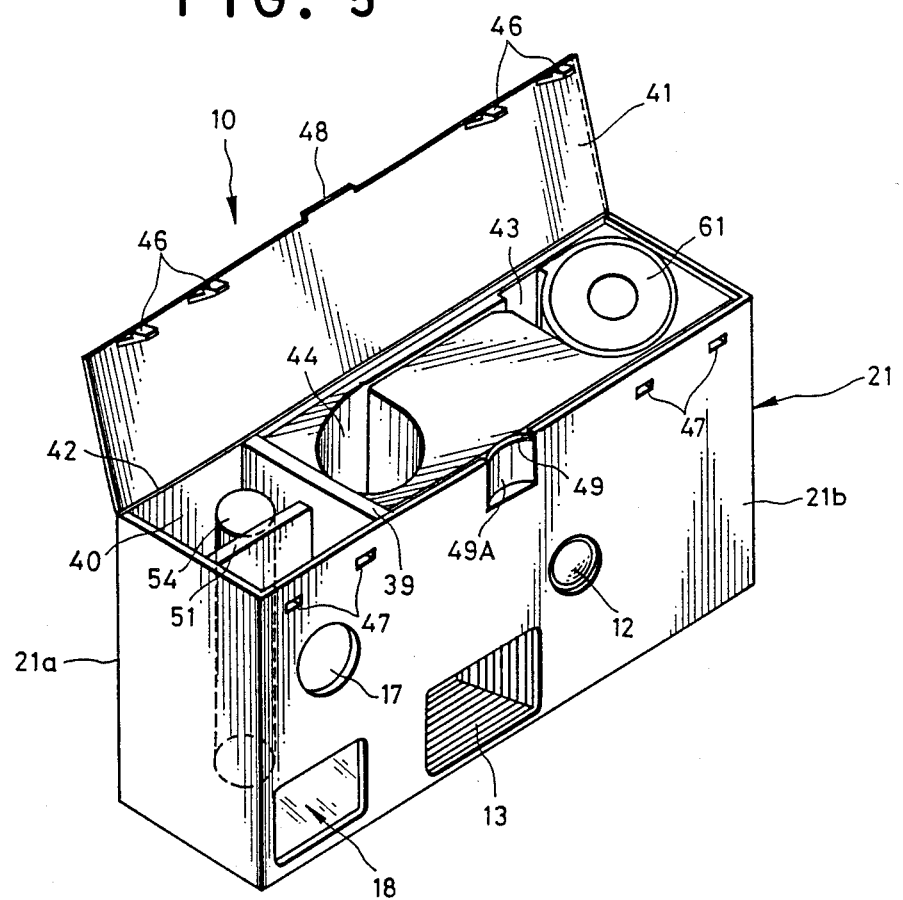
FIG. 5 is a perspective view illustrating the lens-fitted photographic film unit of FIG. 1 upside down for explaining the removal of a battery.

Referring to FIG. 5 showing in detail the interior of the film unit 10 illustrated upside down, the film unit housing 21 is formed therein with a film container chamber 43 with an empty film container such as an empty film patrone 61 disposed therein and a film roll receiving chamber 44 with a roll of film (not shown) such as a 135-size film (defined by ISO code 1007; 1979 version) disposed therein. The leading end of the roll of film is fixedly connected to a spool of the patrone 61. An openable bottom cover 41 is formed integrally with the back wall 21a of the film unit housing 21 to close light-tightly the bottom opening of the film unit housing 21 over the flash unit and the film roll receiving and film container receiving chambers 40, 43 and 44. To keep the price low, the film unit housing 21 is so constructed as to be quite simple in construction and disposable.

The bottom cover 41 is opened to remove the film patrone 61 and/or the battery 54 from the film unit housing 21. For easy and smooth opening, there is formed a thinned line or a groove 42 serving as a flexible hinge along a joint between the back wall 21a of the film unit housing 21 and the bottom cover 41. In order to hold the bottom cover 41 in its closed position, the bottom cover 41 is formed with hooks 46 on the front edge thereof which are captured by capturing holes 47 formed in the front wall 21b of the film unit housing 21. Formed at the middle of the front edge of the bottom cover 41 is a lug 48 which is received in a notch 49 in the front bottom edge over a recess 49A formed in the front wall 21b of the film unit housing 21. Owing to the provision of the recess 49A, the lug 48 is accessible to a finger for opening the bottom cover 41.

In the use of the film unit 10 in the external casing 2 according to the present invention, the charge switch 17 is pushed by a finger to charge the main capacitor 55. When the main capacitor 55 is charged, the neon lamp 57 is turned on to emit red light, which indicates that the electronic flash 50 is ready for use. On the other hand, when the charge switch 17 is released, the charging of the main capacitor 55 is terminated.

When the shutter release button 14 is depressed, the shutter actuating lever 23, which is shown as having been recocked in FIG. 3, actuates the shutter blade 24 to rapidly turn in the clockwise direction to a position shown by a phantom line in FIG. 3, so as fully to open the exposure aperture 26. At the end of turning of the shutter blade 24, the shutter blade 24 pushes the contact member 32 with its lower edge to bend member 32 down, thereby bringing the inner end of the contact member 32 into contact with the contact member 33.

As is well known in the art, upon contact between the contact members 32 and 33, a trigger signal is applied to a triggering circuit in the charge and discharge control circuit so as to discharge a high voltage charge in the main capacitor 55 through the discharge lamp 18. As a result, a high energy of radiation is emitted from the discharge lamp 18 to illuminate an object. Immediately after the discharge of the main capacitor 55, the shutter blade 24 is released by the shutter actuating lever 23 to return to its initial position shown by a solid line in FIG. 3 by means of the spring 25, closing again the exposure aperture 26. When the main capacitor 55 is discharged, the neon lamp 57 will turn off, which indicates that the charge switch 17 has to be operated to ready the electronic flash unit 50 for the next exposure. The film is withdrawn from the film roll receiving chamber 44 and is wound on the spool in the film patrone 61 by one frame by operating the film advancing knob 16.

After all the frames of the film in the film unit 10 have been exposed, the film unit 10 is forwarded to a photo shop or photo laboratory to develop the film and to make prints. There, after removing the film unit 10 from the external casing 2, the patron 61 with exposed film therein and the battery 54 are removed from the film unit 50 and, then, the film unit housing 21 is scrapped. For removing the exposed film and the battery 54, the bottom cover 41 is opened by pushing the lug 48 with the tip of a finger to disengage the hooks 46 from the capturing holes 47. Since the battery 54 is held only by the spring contact member 56, it is easy to be removed from the film unit housing 21. In place of using the spring contact member 56, a lead wire may be used. In this case, the lead wire is pulled off when the battery 54 is removed from the film unit housing 21. In the above-described film unit 10, as the bottom cover 41 is adapted to cover the patrone receiving chamber 43 and the electronic flash chamber 40, it is easy to take out the battery 54 when removing the film patrone 761 from the film unit housing 21.

Figure 6:
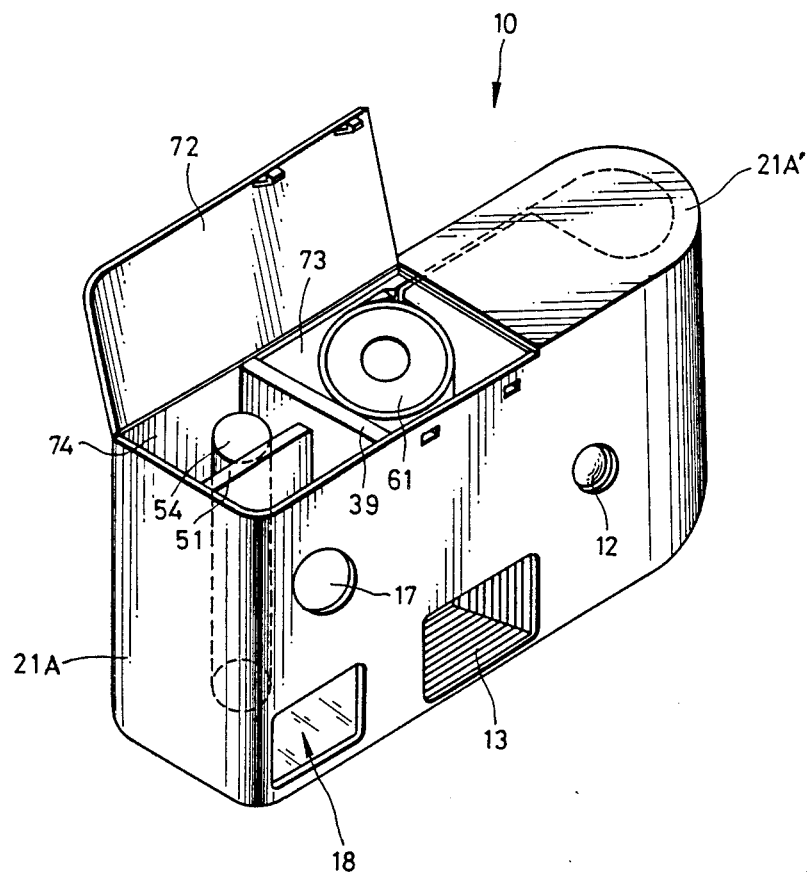
FIG. 6 is a perspective view showing a lens-fitted photographic film unit with a built-in electronic flash according to another preferred embodiment of the present invention.

Referring to FIG. 6 showing a film unit with a built-in electronic flash unit according to another preferred embodiment of the present invention, a film unit housing 21A is shaped to have one side 21A' rounded and is formed with a film patrone receiving chamber 73 and a flash unit chamber 74 arranged side by side. A bottom cover 72 is connected to the film unit housing 21A in the same manner as in the previous embodiment to open the bottom openings of the film patrone receiving chamber 73 and the flash unit chamber 74. The side-by-side arrangement of the film patrone receiving chamber 73 and the flash unit chamber 74 makes it possible to make the bottom cover 72 small.

Figure 7:
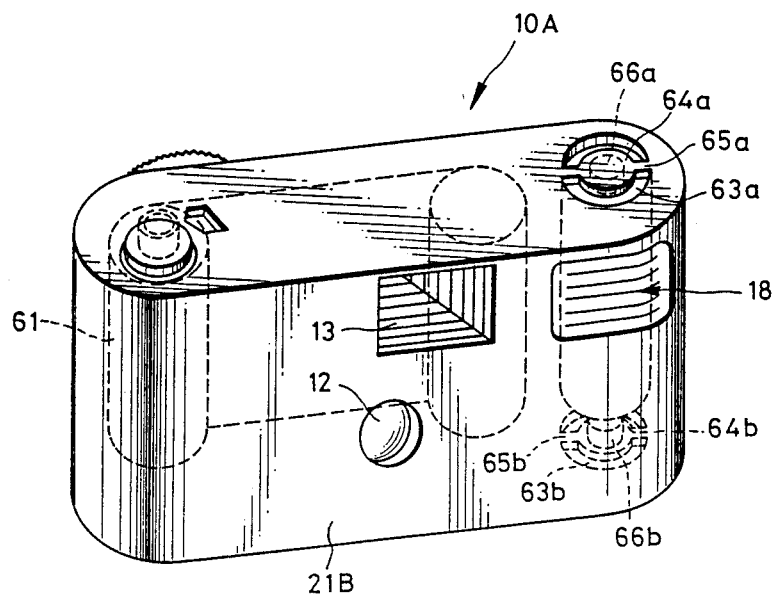
FIG. 7 is a perspective view of a lens-fitted photographic film unit with a built-in electronic flash according to still another preferred embodiment of the present invention.

FIG. 7 shows a film unit according to still another preferred embodiment of the present invention of which both sides are rounded. In one rounded space of a film unit housing 21B of the film unit 10A there is incorporated an electronic flash assembly. The top and bottom wall of the film unit housing 21B are formed with circular openings 63a and 63b which are blocked by circular blocking members 64a and 64b connected to the top and bottom wall by bridges 65a and 65b, respectively. Each blocking member 64a, 64b has a holding projection 66a, 66b formed integrally with the inner surface thereof. Between the holding projection 66a and 66b, the battery 54 is firmly held. These blocking members 64a and 64b are torn off when taking out the battery 54. It is necessary to shield a film inside the film unit from ambient light, given the provision of the blocking members 64a and 64b.

Figure 8:
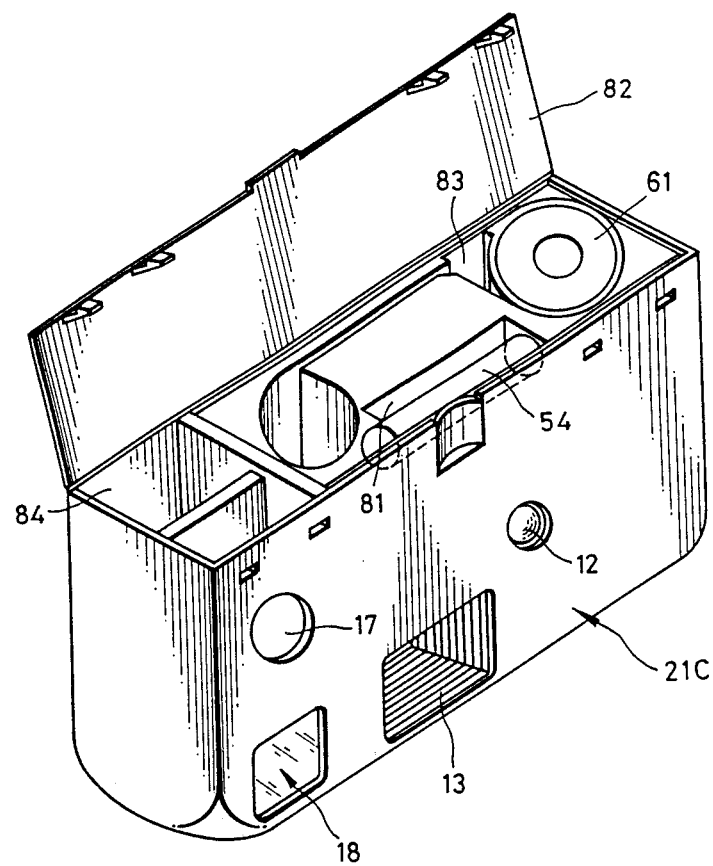
FIG. 8 is a perspective view showing a lens-fitted photographic film unit with a built-in electronic flash according to yet another preferred embodiment of the present invention.

FIG. 8 shows a film unit according to yet another preferred embodiment of the present invention in which a battery 54 of the electronic flash unit 40 is disposed in a battery chamber 81 formed below the taking lens 12 in the film unit housing 21C. A bottom cover 82 is provided integrally with the back wall of the film unit housing 21C to close light-tightly the film patrone receiving chamber 83, the battery chamber 81 and the flash unit chamber 84.

Figure 9:
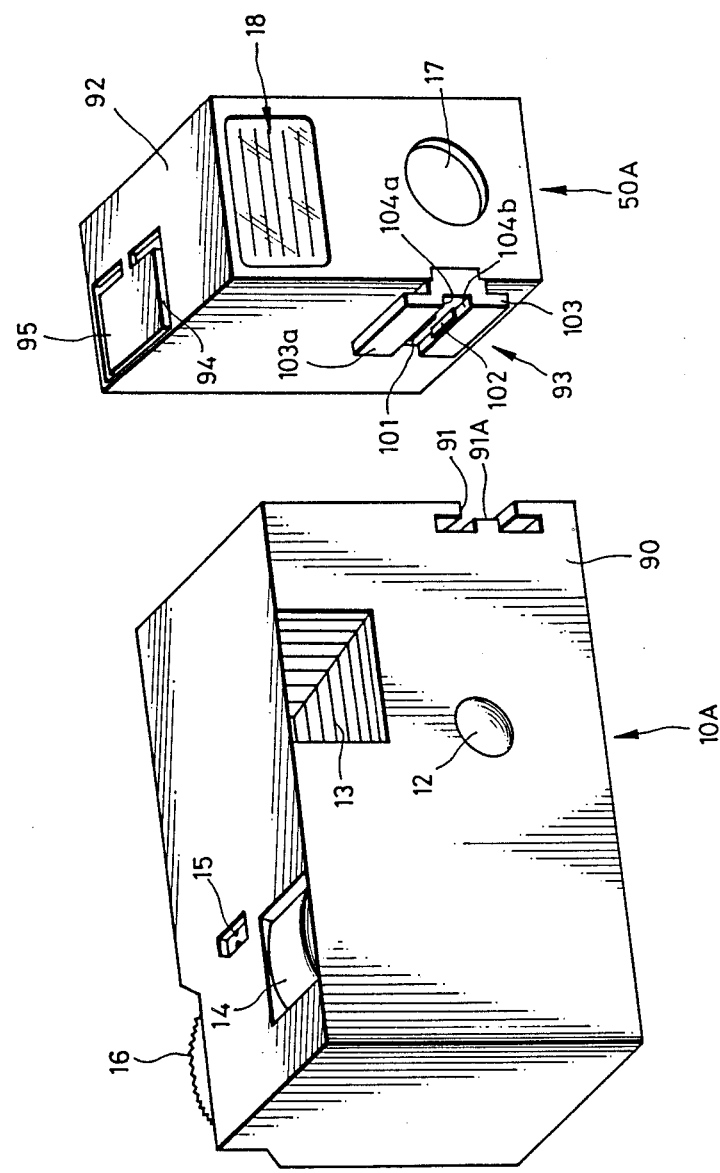
FIG. 9 is an exploded perspective view of a lens-fitted photographic film unit of a further preferred embodiment of the present invention which is preferably used in cooperation with a disposable electronic flash shown to the right of the lens-fitted photographic film unit.
Figures 10, 11:
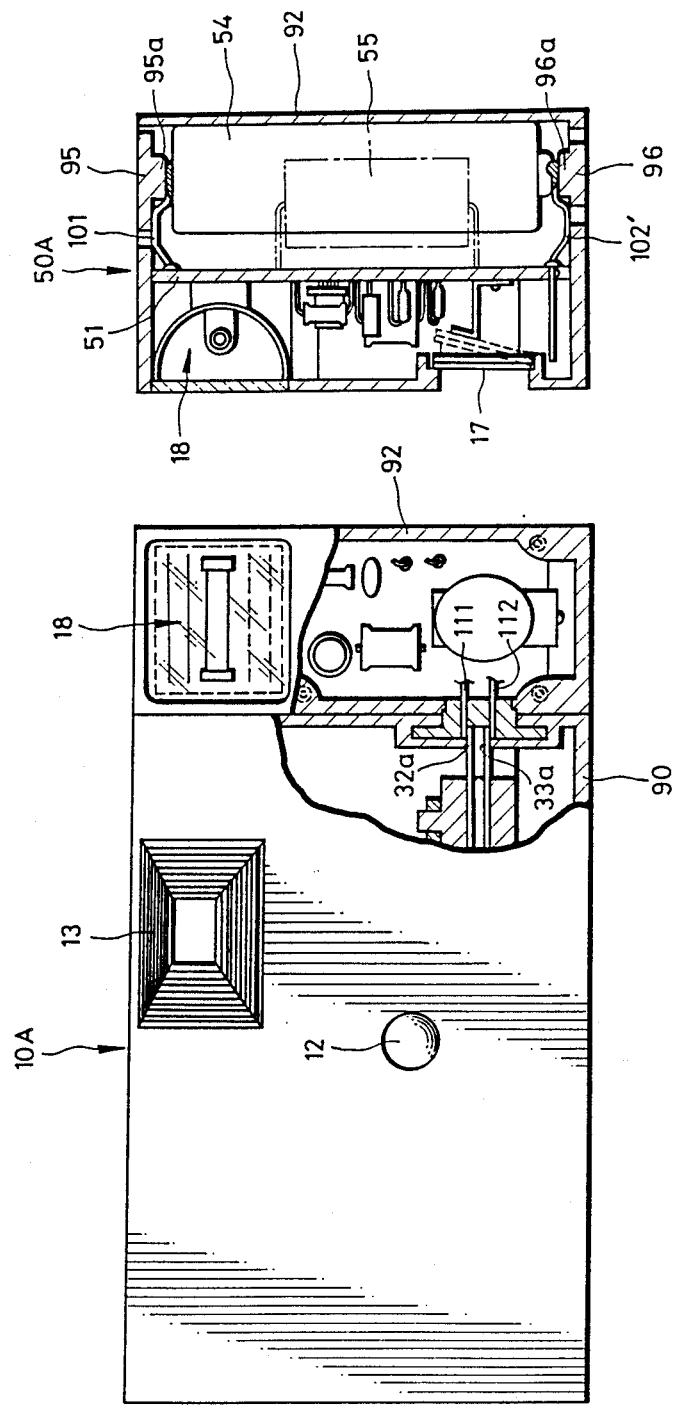
FIG. 10 is a front view partially showing the interior of the lens-fitted photographic film unit and the electronic flash attached thereto of FIG. 9.
FIG. 11 is a cross sectional view showing the interior of the electronic flash of FIG. 9.

FIGS. 9 to 11 show a film unit assembly according to a further preferred embodiment of the present invention which comprises a lens-fitted film unit 10A and an electronic flash unit 50A separately provided and connected to each other. The lens-fitted film unit 10A and the electronic flash unit 50A can be provided by dividing the film unit 10 of the first embodiment shown in FIGS. 2 to 4. The film unit 10A has the same elements and mechanisms as the film unit 10 shown in FIGS. 2 to 4. A film unit housing 90 of the film unit 10A is provided with a hot shoe 91 having a center projection 91a. On the other hand, an electronic flash housing 92 of the electronic flash unit 50A is provided with a hot shoe connection 93 connectable to the hot shoe 91 of the film unit housing 90.

The hot shoe connection 93 comprises a pair of leaf contacts 101 and 102 made of a conductive thin metal and a mounting member 103 mounting the left contacts 101 and 102 in spaced apart relation thereon. This mounting member 103 is made of plastic materials and molded in a shape having a generally T-shaped cross section. This mounting member 103 is formed with a center groove extending in the direction of the depth of the housing 92 of which the inside walls 104a and 104b have secured thereto the tip ends of the leaf contacts 101 and 102. It is to be noted that these tip ends of the leaf contacts 101 and 102 are placed within the center groove so as not to project from the outer surface 103a of the mounting member 103 in order to be kept free from oil and foreign substances.

The electronic flash housing 92 is formed with top and bottom openings 94 through which a battery in the electronic flash unit 50A may be removed, and covers 95 closing the top and bottom openings 94. The covers 95 are formed integrally with the top and bottom walls of the electronic flash housing 92 and are able to be torn off.

In the housing 92 of the electronic flash 50A, there is the printed circuit base board 51 which holds the flash lamp assembly 18 and the charge switch 17 on the front thereof and the main capacitor 55 on the back thereof. The battery 54 as a power source of the electronic flash unit 50A is connected to the flash control circuit through lead wires 102' welded to both its poles and is held between projections 95a and 96a formed integral with the covers 95.

The contact members 32 and 33 of the synchronizing contact unit are, as described as to the first embodiment, received in the transverse slot 27 formed in the shutter bearing plate 22 below the exposure aperture 12. Outer ends 32a and 33a of the contact members 32 and 33 project outside the film unit housing 90 so s to pinch the center projection 91a (see FIG. 9) of the hot shoe 91. These outer ends 32a and 33a of the connecting members 32 and 33 are brought into contact with the outer ends of contact members 111 and 112 of the electronic flash 50A when the electronic flash 50A is attached to the film unit 10A.

For attaching the electronic flash unit 50A to the film unit 10A, the mounting members 103 and 103a of the hot shoe connection 93 are slidably inserted into the grooves of the hot shoe 91 of the film unit housing 90 and pushed in the rearward direction until the rear end of the mounting member 103 abuts against the end of the grooves of the hot shoe 91. As a result, the contact members 32, 33 and 111, 112 are electrically coupled at their outer ends as is shown in FIG. 10 thereby to couple the electronic flash unit 50A to the film unit 10A as one unit. The film unit 10A with the electronic flash unit 50A attached thereto is encased in the cardboard casing 2 shown in FIG. 1.

The operation of the film unit 10A with the electronic flash unit 50A attached thereto as one body in the external casing 2 is the same as the film unit 10 shown in FIG. 2. After all frames of the film in the film unit 10A have been exposed, thefilm unhit 10A with the electronic flash unit 10A attached is forwarded to a photo shop or a photo laboratory to develop the film and to make prints. At that place, after removing the film unit 10A with the attached electronic flash unit 50A from the external casing 2, the patrone 61 with exposed film therein is taken out. Before scrapping the film unit housing 10A and the electronic flash unit 50A, the battery 54 is removed. For removing the battery 54, the top and bottom openings 94 and 96 are opened by tearing off the top and bottom covers 95 and 97 with the fingers or with a tool. The lead wires 101 and 102 are cut by the use of a nipper or the like. Then, the battery 54 is easily removed from the electronic flash housing 92 through the top or bottom opening and is put aside.

According to this embodiment of the present invention, the upper and lower battery cover members have projections to press the top and bottom poles of a battery to firmly hold the battery. Owing to the provision of the holding means, the battery is prevented from being subjected to shocks and vibrations, so that the electronic flash is prevented from misfiring.

FIGS. 12 and 13 show a film unit assembly of a still further preferred embodiment of the present invention. The film unit assembly comprises a film unit 10B and an electronic flash unit 50B similar to the film unit 10A and the electronic flash unit 50B of FIGS. 11 and 12, respectively. These units are attached to each other through a hot shoe 121 of the film unit 120 and a hot shoe connection 133 of the flash unit 50B. A film unit housing 120 of the film unit 10B is provided with a film unit bottom cover 125 formed integrally with the back wall of the film unit housing 120 to close light-tightly the bottom opening of the film unit housing 120 over a film container receiving chamber 122 and film roll receiving chamber 123. In order to hold the film unit bottom cover 125 in its closed position, the film unit bottom cover 125 is formed with hooks 127 on the front edge thereof which are captured by capturing holes 129 formed in the front wall of the film unit housing 120. Formed at the middle of the front edge of the film unit bottom cover 125 is a lug 128 which is received in a notch 130 in the front bottom edge over a recess 130A formed in the front wall of the film unit housing 120. Formed in the film unit bottom cover 125 is a rectangular recess 126 which receives a lug 139 of a flash unit bottom cover 136 which will be described in detail later. Owing to the provision of the recess 130A, the lug 128 is easily accessible to a finger for opening the bottom cover 125.

On the other hand, a flash unit housing 132 of the electronic flash unit 50B is provided with a flash unit bottom cover 137 formed integrally with the back wall of the flash unit housing 132 to close light-tightly the bottom opening 134 of the flash unit housing 132 over a flash unit chamber 235. In order to hold the flash unit bottom cover 237 in its closed position, the flash unit bottom cover 137 is formed with a hook 138 on the front edge thereof which is captured by capturing holes 239 formed in the front wall of the flash unit housing 132. The flash unit bottom cover 137 is formed with a laterally projecting lug 140 which is received outwardly in the square shaped recess of the film unit bottom cover 125 when the electronic flash unit 50B is attached to the film unit 10B through the hot shoe 121 and the hot shoe connection 133.

Owing to the provision of the laterally projection lug 140 of the flash unit bottom cover 132, when the film unit bottom cover is opened, the flash unit bottom cover 237 is opened through the engagement of the recess 126 of the film unit bottom cover 125 by the laterally projecting lug 140 of the flash unit bottom cover 137. It is permissible to form the lateral projection 140 in the film unit bottom cover 125 and the recess 126 in the flash unit bottom cover 137. By virtue of the provision of the film unit and flash unit bottom cover 125 and 137 thus formed, the film patrone 61 and the battery 54 are quite easily accessible to be removed.

According to the above-described embodiments of the present invention, because the battery cover member is always opened when the film container cover member is opened to remove a film container containing an exposed film for developing the exposed film, an additional operation such as destroying a part of the film unit is not necessary to take over the battery. This leads not only to an easy operation of removing a battery from the film unit but also to the prevention of scrapping the film unit without removing a battery.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A lens-fitted film unit having a roll of film, a taking lens having an optical axis, exposure means and an electronic flash, said lens-fitted film unit comprising:
   a film unit housing which is provided with a film container receiving chamber containing a film container into which said roll of film is wound after exposure and a battery receiving chamber containing a battery for said electronic flash, said film container having an axis perpendicular to said axis of said taking lens;
   a container cover member covering said film container receiving chamber which is opened to remove said film container from said film container receiving chamber; and
   a battery cover member covering said battery receiving chamber which is so arranged so as to be opened by opening of said film container cover member;
   said cover members being mounted on said unit for opening and closing movement about an axis perpendicular to said lens and container axes.

2. A lens-fitted film unit as defined in claim 1, wherein said film container cover member and said battery cover member are integrally formed as one member.

3. A lens-fitted film unit as defined in claim 1, wherein said film container receiving chamber and said battery chamber are separable but are connectable to each other, and one of said film container and battery cover members is formed with an engaging member which is engaged by the other of said film container and battery cover members upon said connection of said film container receiving chamber and said battery chamber so as always to open the battery cover member which said film container cover member is opened to remove said film container.

4. A lens-fitted film unit as defined in claim 3, wherein said engaging member is formed on said battery cover chamber.

5. A lens-fitted film unit as defined in claim 3, wherein said engaging member is formed on said film container cover member.

6. A lens-fitted film unit as defined in claim 1, wherein said battery receiving chamber is disposed between said film container receiving chamber and a film roll receiving chamber containing a roll of unexposed film.

7. A lens-fitted film unit having a film, a taking lens having an optical axis, exposure means and an electronic flash, said lens-fitted film unit comprising:
   a film unit housing which is provided with a film container receiving chamber containing a film container into which said film is wound after exposure and a roll film receiving chamber containing a roll of unexposed film, said film container having an axis perpendicular to said axis of said taking lens;
   an electronic flash housing containing a battery for said electronic flash;
   a container cover member covering said film container receiving chamber which is opened to remove said film container from said film container receiving chamber; and
   a battery cover member covering said battery which is so arranged as to be opened by opening of said film container cover member;
   said cover members being mounted on said unit for opening and closing movement about an axis perpendicular to said lens and container axes.

8. A lens-fitted film unit having a film, a taking lens, exposure means and an electronic flash, said lens-fitted film unit comprising:
   a film unit housing which is provided with a film container receiving chamber containing a film container into which said film is wound after exposure and a roll film receiving chamber containing a roll of unexposed film;
   an electronic flash housing containing a battery for said electronic flash which is selectively separable from and attachable to said film unit housing;
   a container cover member covering said film container receiving chamber which is opened to remove said film container from said film container receiving chamber; and
   a battery cover member separate from said container cover member and closing said electronic flash housing to cover said battery which is so arranged as to be opened by said film container cover member only when said flash is attached to said film unit housing.

9. A lens-fitted film unit as defined in claim 8, wherein one of said film container and battery cover members is formed with an engaging member which is engaged by said battery cover member when said film container cover member is opened to open said battery cover member.

10. A lens-fitted film unit as defined in claim 9, wherein said engaging member is formed on said battery cover member.

11. A lens-fitted film unit as defined in claim 9, wherein said engaging member is formed on said film container cover member.

12. A lens-fitted film unit having a film, a taking lens, exposure means and an electronic flash, said lens-fitted film unit comprising:
   a film unit housing which is provided with a film container receiving chamber containing a film container into which said film is wound after exposure and a roll film receiving chamber containing a roll of unexposed film;
   an electronic flash housing containing a battery for said electronic flash; and
   a battery cover member covering said battery, said battery cover member being a part of a wall of said flash housing which is torn off to form an opening in said wall through which said battery is removed.

13. A lens-fitted film unit as claimed in claim 12, wherein said battery cover member is formed in both of top and bottom walls of said flash housing.

14. A lens-fitted film unit as defined in claim 12, wherein said battery cover member is provided with a projection to press upon at least one of opposite ends of said battery.

15. A lens-fitted unit as defined in claim 12, wherein said flash housing has opposed internal projections that press upon opposite ends of said battery.

16. A lens-fitted film unit having a roll of film, a taking lens having an optical axis, exposure means and an electronic flash, said lens-fitted film unit comprising:
   a film unit housing which is provided with an unexposed film roll chamber, a film container receiving chamber containing a film container into which said roll of film is wound after each exposure and a battery receiving chamber containing a battery for said electronic flash, said film container having an axis perpendicular to said axis of said taking lens, and said battery receiving chamber being disposed between the front wall of said film unit housing and an exposure station on the one hand, and between said unexposed film roll chamber and said film container receiving chamber on the other hand, and below said axis of said taking lens; and a container cover member covering at least said film container receiving chamber which is opened to remove not only said film container from said film container receiving chamber but also said battery from said battery receiving chamber.

* * * * *